United States Patent [19]

Kamigaito et al.

[11] Patent Number: 4,497,869
[45] Date of Patent: Feb. 5, 1985

[54] FORMED PRODUCT OF VERMICULITE AND METHOD FOR PRODUCING THE SAME

[75] Inventors: Osami Kamigaito; Haruo Doi, both of Nagoya; Yoshiaki Fukushima, Aichi, all of Japan

[73] Assignee: Kabushiki Kaisha Toyota Chuo Kenkyusho, Japan

[21] Appl. No.: 476,014

[22] Filed: Mar. 15, 1983

[30] Foreign Application Priority Data

Mar. 19, 1982 [JP] Japan .................................. 57-45448

[51] Int. Cl.$^3$ ................................................ B32B 3/26
[52] U.S. Cl. ................................ 428/402; 241/21 R; 252/378 R; 423/328; 428/363
[58] Field of Search ............... 428/327, 331, 402, 363; 252/378 R; 423/328; 241/21 R

[56] References Cited

U.S. PATENT DOCUMENTS

| | | | |
|---|---|---|---|
| 2,914,107 | 11/1959 | Gaines, Jr. ............................. | 241/21 |
| 3,813,346 | 5/1974 | Wada et al. ...................... | 252/378 R |
| 4,112,185 | 9/1978 | Meiller ................................ | 428/331 |
| 4,130,687 | 12/1978 | Ballard et al. ................... | 252/378 R |
| 4,269,628 | 5/1981 | Ballard et al. ................... | 252/378 R |
| 4,277,456 | 7/1981 | Dabrowski .......................... | 428/402 |
| 4,400,297 | 8/1983 | Cruz, Jr. .......................... | 252/378 R |

*Primary Examiner*—John E. Kittle
*Attorney, Agent, or Firm*—Berman, Aisenberg & Platt

[57] ABSTRACT

A formed product of vermiculite comprising thin leaves of vermiculite containing cations of one or more elements selected from the group consisting of copper, aluminum, manganese, II group elements, IV group elements and VIII group elements, substituted for exchangeable cations retained in vermiculite. Such a formed vermiculite product has high strength as well as excellent heat resistance. The formed product of vermiculite can be obtained by a method comprising the steps of crushing vermiculite to obtain thin leaves thereof, subjecting the thin leaves to ion exchange to substitute exchangeable cations retained therein by cations of one or more elements selected from the group consisting of copper, aluminum, manganese, II group elements, IV group elements and VIII group elements, and forming the resulting thin leaves into a stack or laminate. The formed vermiculite product thus obtained can retain further properties, such as an ability to expand and water resistance. More particularly, when the formed product (subjected to such ion exchange) is contacted with hydrogen peroxide, the resulting expanded formed product of vermiculite is suitable as a fixing material, shock absorber and the like, further retaining excellent compressibility, on the other hand, the product is heated in an oxidative atmosphere to obtain a formed vermiculite product having excellent water resistance as well as high strength, which is useful for a heat-insulating material and a refractory-facing material for a building.

23 Claims, No Drawings

FORMED PRODUCT OF VERMICULITE AND METHOD FOR PRODUCING THE SAME

BACKGROUND OF THE INVENTION

1. Field of the Invention

The present invention relates to a heat resistant vermiculite shaped product which comprises thin leaves of vermiculite and to a method for producing such product.

2. Description of the Prior Art

Conventionally, vermiculite, which is a flaky mineral, is subjected to heat treatment or the like to be expanded among layers thereof and to be exfoliated. The exfoliated vermiculite is then crushed to obtain thin leaves of vermiculite, and the thin leaves are formed into various shapes.

The thus-obtained formed products have heat resistance and are thus widely used for heat-insulating material for heat-treating furnaces or the like, sealing material, etc. However, the prior art formed products have poor compressibility and, therefore, even when they are put to use as heat-insulating or sealing material, their utility is limited.

An attempt to improve compressibility of the formed product has also been proposed. According to this attempt, thin leaves of vermiculite, obtained by the aforesaid expansion and crushing and/or organic or inorganic fiber, such as glass fiber or α-sepiolite, is admixed with powder of non-exfoliated vermiculite or with thin leaves of vermiculite prepared by the exfoliation of vermiculite in the course thereof and crushing the same; the resulting mixture is then formed to obtain a shaped product. When the thus-obtained formed product is put to use, it has to be subjected to heat treatment or treated with aqueous hydrogen peroxide or the like in order to expand vermiculite among layers thereof. However, this vermiculite formed product also has poor compressibility and poor flexibility, because the degree of expansion of the thin leaves of vermiculite is not large. According to the aforesaid attempt, in addition to the aforesaid disadvantages it is difficult to obtain a formed product which can uniformly expand throughout the product. Moreover, the coefficient of expansion of the thus-produced formed product is also as small as about 2 to 3 times the thickness of the original product.

On the other hand, the formed vermiculite product according to the prior art has poor water resistance. The formed vermiculite product in this prior art maintains its shape by bonding the thin leaves of vermiculite with one another. The surface of the thin leaves of vermiculite, however, is liable to be wettable. Therefore, if water or other liquids permeate the aforesaid formed product of vermiculite, the thin leaves are swollen therewith, resulting in loss of their bonding force. As a result, the thin leaves constituting the formed vermiculite product are broken up and dispersed.

SUMMARY OF THE INVENTION

The inventors have intently conducted many investigations in order to provide a shaped vermiculite product having heat resistance and which overcomes the aforesaid drawbacks or disadvantages in the prior art. As a result, the present invention was developed.

Accordingly, one object of the present invention is to provide a formed product of vermiculite comprising thin leaves of vermiculite containing cations of one or more elements (selected from the group consisting of copper, aluminum, manganese, a Group II element of the periodic table, a Group IV element of the periodic table and a Group VIII element of the periodic table) substituted for exchangeable cations retained in vermiculite.

Another object of the present invention is to provide a formed product with high strength, as well as excellent heat resistance, so that the thin leaves of vermiculite constituting the product are bonded to one another with strong force.

Still another object of the present invention is to provide a shaped product of vermiculite which retains further properties, such as even water resistance and uniform expansion.

A further object of the present invention is to provide a formed product of vermiculite suitable for use as packing or filler, fixing material, shock absorber and the like, having excellent compressibility in addition to heat resistance.

A still further object of the present invention is to provide a shaped vermiculite product having not only high strength but also excellent water resistance so that the product can also be used as heat insulating material and refractory facing material for a building.

A still further object of the present invention is to provide a formed product of vermiculite which is capable of overcoming conventional drawbacks or disadvantages.

A still further object of the present invention is to provide a method for producing the above-mentioned formed product of vermiculite.

The foregoing and other objects are effected by the invention, as is apparent from the following description and claims.

DETAILED DESCRIPTION

One aspect of the present invention provides a shaped vermiculite product comprising thin leaves of vermiculite containing cations of one or more elements (selected from the group consisting of copper, aluminum, manganese, a Group II element, a Group IV element and a Group VIII element) substituted for exchangeable cations retained in vermiculite. Hereinafter, the aforesaid formed product of vermiculite will be called a first aspect of the invention.

According to the first aspect of the invention, since thin leaves of vermiculite constituting the formed product are subjected to ion exchange and exchangeable cations retained therein are substituted by cations having a large number of values, they are bonded to one another with a strong force. As a result, the resulting vermiculite shaped product has high strength.

The vermiculite product formed according to the first aspect of the invention can exhibit expansion phenomenon greater than that of a conventionally-formed vermiculite product when contacted with hydrogen peroxide. Therefore, the formed vermiculite product according to the first aspect of the invention is useful for packing or filler, for fixing material, for shock absorbers, etc., having excellent compressibility as well as excellent heat resistance.

Moreover, the formed product of vermiculite according to the first aspect of the invention also becomes water resistant when heated, whereas conventionally-formed vermiculite products lack this property. In the meantime, a formed vermiculite product, subjected to ion exchange with zinc ions or with zirconium ions (one of the Group IV elements) can retain such water resistance without heat treatment.

Hereinafter, the first aspect of the invention will be explained in more detail.

Vermiculite to be employed in the first aspect of the invention is a flaky mineral formed essentially by layers of aluminum silicate and containing aluminum or the like substituted at random for silicon atoms in tetrahedral positions. Its typical chemical formula is as follows:

$$\{E_{0.6 \text{ to } \sim 0.9}\}(Mg)[Si,Al]_4O_{10}(OH)_2 \cdot nH_2O$$

in which E stands for an exchangeable cation, such as potassium, sodium, or the like. However, E is not limited to potassium or sodium.

The thin leaves of vermiculite, constituting the formed product of vermiculite according to the first aspect of the invention, are obtained, e.g., by crushing such vermiculite. These thin leaves are formed by the separation of aluminum silicate layers defining the substrate of vermiculite.

To separate the layers, vermiculite is heated at a high temperature so that water which exists among the layers is rapidly expanded; vermiculite is alternatively contacted with hydrogen peroxide to expand the same.

The thin leaves consist of from one layer to several thousand layers of aluminum silicate. The thickness thereof does not exceed about 100 microns ($\mu$m) and the aspect ratio (the ratio of the square root of its surface area to its thickness) is at least 5. The individual thin leaves per se have a certain degree of flexibility because of their small thickness.

According to the first aspect of the invention, thin leaves of vermiculite are subjected to ion exchange so that the thin leaves contain predetermined cations substituted for a part or all of the aforesaid exchangeable cations E retained in vermiculite. The predetermined cations thus exchanged exist on the surfaces of the thin leaves and among layers thereof.

In addition to cations of copper, aluminum and manganese, other effective cations for ion exchange in the first aspect of the invention are as follows:

cations of Group II elements, such as zinc, magnesium, etc.; cations of Group IV elements, such as titanium, zirconium, germanium, tin, etc.; and cations of Group VIII elements, such as iron, cobalt, nickel, palladium, etc.

The formed product of vermiculite (according to the first aspect of the invention) comprises thin leaves of vermiculite containing the aforesaid cations substituted for exchangeable cations retained in vermiculite, wherein the thin leaves are united together by a method similar to papermaking, press or the like, and thus formed into a sheet or clod.

As one example, the formed vermiculite product according to the first aspect of the invention is useful for packing or filler. When the formed vermiculite product is inserted into a narrow space between refractory bricks and then expanded therein, such a narrow space is charged with the formed product of thus-expanded vermiculite. In other words, the aforesaid formed vermiculite product also provides a strong sealing effect.

The formed vermiculite product according to the first aspect of the invention is optionally constituted only by thin leaves as hereinabove described. Alternatively, the aforesaid formed product contains additives to impart further strength at the normal temperature and reflectivity. As possible additives, the following are useful: organic fibers, such as cotton, pulp, phenol and the like; inorganic fibers, such as asbestos, glass fiber, SIRASU fiber (glass fiber made from a mineral called "SIRASU" similar to volcanic ash) and the like; rubber latex; polyvinyl alcohol; silicone rubber which solidifies at room temperature; etc.

Another aspect according to the present invention is directed to a method for producing the formed vermiculite product according to the first aspect of the invention.

Namely, the method according to the second aspect of the invention comprises the steps of crushing vermiculite to obtain thin leaves of vermiculite; subjecting the thin leaves of vermiculite to ion exchange, thus substituting exchangeable cations retained therein by cations of one or more other elements (selected from the group consisting of copper, aluminum, manganese, a Group II element, a Group IV element and a Group VIII element); and forming the resultant thin leaves into a stack or laminate. Hereinafter, this method is referred to as a second aspect of the invention.

According to the second aspect of the invention, exchangeable cations E retained in the thin leaves of vermiculite are substituted by predetermined cations having a large number of values, but a small ionization. The thin leaves of vermiculite are therefore easily united with one another to obtain a formed vermiculite product united by a strong bonding force.

Moreover, since vermiculite is crushed to obtain thin leaves thereof and the aforesaid ion exchange is thereafter carried out with the obtained thin leaves, the vermiculite product formed by stacking the thin leaves in layers allows cations to exist therein with an approximately uniform distribution. A formed vermiculite product which is uniformly expandable and which has uniform water resistance is thus obtained.

Hereinafter, the second aspect of the invention will be explained in more detail.

Firstly, vermiculite, as a raw material, is crushed to prepare thin leaves thereof in a crushing step. Particulate vermiculite employed in the aforesaid crushing step is preliminarily contacted with hydrogen peroxide or subjected to heat treatment. By such a treatment, the aforesaid vermiculite, as a raw material, is exfoliated in the form of an accordion. Thin leaves of vermiculite having a high aspect ratio are obtained by crushing such exfoliated vermiculite. Suitable crushing methods include use of a mixer, a ball mill or the like. Crushing is effected either by a dry system or a wet system.

The thin leaves of vermiculite obtained by the aforesaid crushing step are then subjected to ion exchange to substitute exchangeable cations retained therein by cations of one or more elements selected from the group consisting of copper, aluminum, manganese, a Group II element, a Group IV element or a Group VIII element.

The aforesaid ion exchange is performed by dispersing the thin leaves of vermiculite in a liquid, such as water, containing the predetermined cations required for the aforesaid ion exchange. Water containing the predetermined cations is prepared by dissolving one or more cation-supplying substance in water. The cation supplying substance is a compound of the aforesaid element required for this ion exchange, e.g., sulfates of the aforesaid element, such as $FeSO_4$, $CoSO_4$, etc.; nitrates thereof, such as $Fe(NO_3)_2$, $Cu(NO_3)_2$, etc.; chlorides thereof, such as $SnCl_4$, $FeCl_2$, etc.; and oxides thereof, such as $TiO_2$, etc.

When at least two kinds of cations are contained in water, anions released from the aforesaid cation-supplying substances must be common to each other or care must be taken that they do not produce deposits when mixed. Further, the concentration of the cation contained in the water must be higher than that of exchangeable ions in the starting vermiculite.

In the meantime, a cation exchange capacity in vermiculite is from 50 to 150 (milliequivalents/100 g) and, therefore, the amount of the cation to be contained in water is, e.g., at least 50 to 150 milliequivalent per 100 g of vermiculite.

According to the present invention, the amount of cation exchange and adsorption is preferably from 20 to 150 milliequivalents per 100 g of vermiculite. When the amount of cation exchange and adsorption is in the range of from 80 to 150 milliequivalents per 100 g of vermiculite, the formed product will have perfect water resistance.

The dispersing time required for this cation exchange and adsorption is from one minute to 24 hours at a room temperature, depending on kinds of a cation-supplying substance.

As for a method for cation exchange and adsorption, it can be supposed that thin leaves of vermiculite or a shaped product thereof may be sprayed with an aqueous solution of cation-supplying substance; otherwise, the shaped product may be immersed in such aqueous solution. However, according to the aforesaid methods, it is impossible to perform cation exchange; a cation-supplying substance and thin leaves of vermiculite are only mixed with each other.

On the other hand, thin leaves of vermiculite subjected to ion exchange according to the second aspect of the invention is then stacked in layers or laminated in the forming step to obtain a shaped vermiculite product.

As for a method for stacking in layers or laminating thin leaves of vermiculite, the thin leaves are dispersed in water containing predetermined cations and then allowed to experience natural sedimentation on the bottom. Alternatively, they are forcibly filtered for deposition on the bottom of a vessel or on a filter paper. A method similar to a papermaking process, or a method in which a slurry is formed from the thin leaves and an appropriate liquid and coated on a flat plane, or otherwise, is optionally employed for this purpose.

On the other hand, if an additive is added, the additive is dispersed in an appropriate liquid together with thin leaves of vermiculite and then stacked in layers or laminated.

Thus, after the thin leaves are stacked in layers or laminated, it is possible to evaporate any liquid contained in the obtained stack or laminate or to remove such liquid by pressing the laminate and applying a pressure thereon, in order to unite the thin leaves together.

And then the united product is dried to obtain a formed product of vermiculite having a bulk density of from 0.9 to 2.5 (g/cm$^3$) according to the first aspect of the invention. The thus-obtained formed vermiculite product is expandable and water resistant as well as heat resistant.

When the formed vermiculite product according to the present invention is put to use, excessive amounts of the cation-supplying substance adhering to the aforesaid thin leaves of vermiculite should be washed with water and removed therefrom before the thin leaves are formed in one body if the employed cation-supplying substance is corrosive and/or is harmful.

Next, a further aspect of the present invention which is performed by using a formed product of vermiculite according to the aforesaid first aspect of the invention, will be explained.

This aspect of the invention is directed to a method for producing an expanded shaped vermiculite product. The method is characterized in that a formed vermiculite product comprising thin leaves of vermiculite, subjected to ion exchange to substitute exchangeable cations retained therein by cations of one or more elements (selected from the group consisting of copper, aluminum, manganese, a Group II element, a Group IV element and a Group VIII element), is contacted with hydrogen peroxide to be expanded. Hereinafter, the aforesaid method will be referred to as a third aspect of the invention.

According to the third aspect of the invention, a formed product of vermiculite, according to the first aspect of the invention, is uniformly expanded. As a result, an expanded-vermiculite shaped product having light weight is obtained.

Hereinafter, the third aspect of the invention will be explained in more detail.

The third aspect of the invention is directed to a method for producing an expanded-vermiculite formed product with reduced bulk density. For this purpose, the formed vermiculite product according to the first aspect of the invention is subjected to expansion treatment.

More particularly, according to this expansion treatment, the aforesaid formed vermiculite product is contacted with hydrogen peroxide to be expanded in a direction perpendicular to the surface of a stack or laminate of the thin vermiculite leaves.

In this treatment, hydrogen peroxide is resolved by the action of exchanged cation contained in the thin leaves of vermiculite to generate an oxygen gas. By pressure of the aforesaid oxygen gas, the formed vermiculite product is expanded among the thin leaves, resulting in an expanded formed product of vermiculite. The degree of this expansion is controlled by the amount of ion exchange, the kind of exchanged ion, the amount of hydrogen peroxide employed in this treatment or surrounding temperature.

As a method for contacting the formed vermiculite product with hydrogen peroxide, it is preferable that an aqueous solution of from 1 to 40 percent by volume (v%) of hydrogen peroxide in its concentration is sprayed on the surface of the aforesaid formed vermiculite product, or is coated thereon by a brush. In addition, the formed vermiculite product may be immersed in aqueous hydrogen peroxide for a short time. In this case, care must be taken to see that the formed vermiculite product is not broken in the aqueous hydrogen peroxide.

The thus-prepared vermiculite product subjected to treatment with hydrogen peroxide is expanded by 1.5 to 30 times the thickness of the original product in several minutes, resulting in an expanded formed product of vermiculite having a bulk density of from about 0.06 to 0.9 (g/cm$^3$).

The thus-obtained shaped vermiculite product is not only useful as a heat-insulating material having heat resistance or an acoustical material but is also a shock absorber for brittle parts composed, e.g., of ceramics and the like.

Next, a still further aspect according to the present invention will be explained.

This aspect of the invention is directed to a formed vermiculite water-resistant product which is characterized by its thin leaves of vermiculite (subjected to ion exchange with cations of one or more elements selected from the group consisting of zinc, a Group IV element and a Group VIII element), the cation-exchange capacity of which does not exceed 10 (meq./100 g). Hereinafter, this formed product is referred to as a fourth aspect of the invention.

The formed vermiculite product according to the fourth aspect of the invention further provides water resistance and strength, as well as heat resistance. Such properties are not provided by a conventionally-formed vermiculite product. Therefore, the aforesaid formed vermiculite product having water resistance differs from conventionally-formed products, and it has a wider range of use. More particularly, it can be used not only for a heat insulating material and a shock absorber but also for a heat resistant and refractory facing material for a building.

In thin leaves of vermiculite constituting the formed vermiculite product according to the fourth aspect of the invention, most exchangeable cations retained therein are fixed thereto so that the cation exchange capacity of the aforesaid thin leaves does not exceed 10 (meq./100 g). Therefore, it is difficult for these fixed cations to be dissolved in water; the thin leaves of vermiculite are thus strongly bonded with one another.

A fifth aspect according to the present invention is directed to a method fo producing the formed vermiculite product according to the fourth aspect of the invention.

More particularly, the method according to the fifth aspect of the invention is characterized in that a formed product composed of thin leaves of vermiculite, which are subjected to ion exchange with cations of one or more elements (selected from the group consisting of zinc, a Group IV element and a Group VIII element), is heated in an oxidative atmosphere to impart water resistance to the aforesaid formed product.

According to the fifth aspect of the invention, such water resistance, as is not retained in a conventionally-formed vermiculite product, is easily given to the formed vermiculite product according to the first aspect of the invention by only heating the same.

Heating in the fifth aspect of the invention is carried out by maintaining the formed vermiculite product at a temperature of from 150° to 600° C. for at least 30 minutes under the oxidative atmosphere.

As a treating furnace for this treatment, either an electric furnace or a flame furnace may be employed. The furnace does not need any special device, but it must be capable of maintaining the required atmosphere.

By this heat treatment, it is possible to fix or adsorb most of the exchanged or substituted cations in thin leaves of vermiculite. These fixed cations are defined as non-exchangeable cations. Thus, the exchanged cations are out of exchangeable cations so that the cation exchange capacity of the thin leaves is reduced to no more than 10 (meq.100 g). Therefore, the thus-obtained vermiculite product has excellent water resistance and also has (mechanically) strongly-bonded thin leaves of vermiculite.

Thus, a shaped vermiculite product having water resistance in addition to heat resistance is obtained.

Having generally described this invention, a further understanding can be obtained by reference to certain specific examples which are provided herein for purposes of illustration only and are not intended to be limiting unless otherwise specified.

EXAMPLE 1

Fifty grams of particulate dried vermiculite (a particle size thereof being from 1 to 5 mm) produced in South Africa was charged into a glass beaker having an internal volume of 1 liter (l). A hundred $cm^3$ of an aqueous solution of 30% by volume of hydrogen peroxide was added to the vermiculite in the beaker and then it was kept at 20° C. for a day, whereby the vermiculite was exfoliated in accordion form. The exfoliated vermiculite was placed in a hot air drier and maintained at a temperature of 100° C. for 15 hours to remove excessive hydrogen peroxide remaining in contact with the vermiculite and to be dried.

Fifty grams of this exfoliated vermiculite, 2 liters of tap water and 28 g of ferrous sulfate ($FeSO_4.7H_2O$), as an iron-ion-supplying substance, were mixed by a home mixer having steel stirring blades for 5 minutes. The vermiculite was thus crushed by a wet system, thereby producing an aqueous suspension of the aforesaid mixture. This aqueous suspension of the mixture was allowed to stand for 4 hours, whereby vermiculite dispersed in the aqueous suspension was subjected to ion exchange to substitute exchangeable cations retained therein by iron ions.

Thereafter, the aqueous suspension of the mixture was sujected to suction filtration by using a Buchner funnel, a suction bottle having an internal volume of 10 liters and filter paper. Then, pulpy vermiculite, remaining on the filter paper after the aforesaid filtration, was admixed with clean water and was again subjected to the same filtration as above described, thereby washing off excessive ferrous sulfate. This washing was further repeated 3 times to obtain thin leaves of vermiculite containing iron ions substituted for exchangeable cations retained therein.

In order to shape the thus-obtained thin leaves by the papermaking process, they were first dispersed in 1 liter of clean water and then subjected to papermaking with a TAPPI standard sheet machine to obtain a sheet measuring 200 mm by 250 mm. The sheet was pressed under a pressure of 20 $g/cm^2$ to remove water therefrom, and it was thereafter contacted with a steel plate treated with chromium plating to be dried, whereby a formed vermiculite product measuring 200 mm by 250 mm by 0.5 mm in thickness (according to the first aspect of the invention) was obtained.

This formed vermiculite product was cut to obtain a product measuring 150 mm by 50 mm, and then the obtained product was sprayed with an aqueous solution of 30% by volume of hydrogen peroxide. The resulting product was kept in a room of 20° C. to be expanded. By this treatment, the aforesaid formed vermiculite product instantly started to expand in thickness and, after about 2 minutes, the thickness thereof became about 14 mm. The thus-expanded formed product was heated at 80° C. for 15 hours to be dried, thereby yielding an expanded formed product of vermiculite measuring 150 mm by 50 mm by 14 mm in thickness.

Thermal conductivity of this expanded formed vermiculite product was measured. As a result, it had a good heat insulating property of 0.05 Kcal/m.hr.°C.

On the other hand, the formed vermiculite product according to the first aspect of the invention was cut to obtain a product measuring 60 mm by 200 mm (by 0.5 mm in thickness) and the resulting product was secured to the outer periphery of a china tube having an outside diameter of 40 mm and a length of 100 mm. This china tube was placed into a tube made of a steel plate coated with aluminum, having an inside diameter of 45 mm, an outside diameter of 46 mm and a length of 60 mm.

One end of the steel tube was then immersed in a vessel filled with an aqueous solution of 30% by volume of hydrogen peroxide to expand the vermiculite. This treatment caused the formed product to absorb the aqueous hydrogen peroxide to be impregnated therewith. As a result, the formed product was expanded between the steel tube and the china tube and a space defined therebetween was charged with this expanded formed product.

Further, the resulting product was subjected to dry treatment at a temperature of 200° C. for 3 hours, thereby obtaining a double tube composed of the steel tube and the china tube secured together by means of the thus-dried formed product interposed therebetween. This double tube was alternately subjected to cooling at 50° C. and heating at 400° C. The alternate treatments were repeated 100 times but there was no change in the bonding between these tubes. Thus, the expanded formed product of vermiculite subjected to the aforesaid treatment exhibited a low degree of thermal fatigue.

An initial force of 8 Kg was required to take the china tube out of the steel tube.

COMPARISON

Fifty grams of exfoliated vermiculite obtained in the same manner as in EXAMPLE 1 and 2 liters of tap water were mixed by a home mixer for 5 minutes to obtain an aqueous suspension of thin leaves of vermiculite.

The resulting suspension was formed into a sheet by the papermaking process and the sheet was thereafter dried to remove water therefrom, whereby a shaped vermiculite product in the form of a sheet measuring 200 mm by 250 mm by 0.5 mm in thickness, which was composed of thin leaves of vermiculite subjected to no ion-exchange adsorption, was produced. The formed vermiculite product in the form of a sheet thus produced was divided into two parts. One of them was coated with an aqueous solution of 50% by weight of ferrous sulfate ($FeSO_4$) by a brush, whereas the other was coated with an aqueous solution of 50% by weight of ammonium nitrate ($NH_4NO_3$) by a brush, followed by heating at 300° C. to be dried, respectively.

Due to this heat treatment, one sheet of vermiculite coated with the aqueous ammonium nitrate was expanded by two times its original thickness. Whereas, the other sheet coated with the aqueous ferrous sulfate was hardly expanded. And then, these formed products of vermiculite were sprayed with an aqueous solution of 30% by volume of hydrogen peroxide and kept for 5 minutes, followed by drying at 100° C., respectively. As a result, the sheet coated with the aqueous ferrous sulfate was expanded by about four times its original thickness. On the contrary, the other sheet coated with the aqueous ammonium nitrate was reduced in its thickness, resulting in a thickness of about 1 mm.

EXAMPLE 2

One formed vermiculite product according to the first aspect of the invention, which was prepared in Example 1, was sprayed with water. Water permeated among thin leaves of vermiculite constituting the product so that the formed vermiculite product was swollen with such water, thereby increasing the thickness to about 1 mm. The aforesaid product could not keep its shape if any external force was applied thereto.

On the other hand, the other formed vermiculite product prepared in Example 1 was subjected to heat treatment by maintaining the same in a heating furnace at 500° C. for 1 hour, whereby a formed vermiculite product having water resistance according to the fifth aspect of the invention was obtained.

The aforesaid formed product was immersed in water for a week, but there was no exfoliation of thin leaves of vermiculite or swelling thereof with water.

Further, mechanical properties of the aforesaid product having water resistance was measured. The results are shown in Table 1. The mechanical properties of the aforesaid product were improved, as compared with those of a conventionally-formed vermiculite product. In addition, the tensile strength of the aforesaid formed product, which was immersed in water, was compared with that of another formed product which was not immersed therein; there was little difference therebetween.

TABLE 1

| item | measured value |
|---|---|
| (1) tensile strength | 130 Kg/cm² |
| (2) compressive strength | 1500 Kg/cm² |
| (3) under a compressive pressure of 200 Kg/cm² | |
| (a) compressive stress | 30% |
| (b) recovery at no load | 40% |
| (c) relief from stress in case the formed product was held in water for 24 hours | 0% |
| (d) creep relaxation in case the formed product was held in water for 24 hours | 0% |

EXAMPLE 3

Fifty grams of exfoliated vermiculite prepared by the same method as in Example 1 was admixed with 2 liters of water and 20 g of ferrous chloride ($FeCl_2.4H_2O$) as an iron-ion-supplying substance, and the mixture was crushed by processing in a home mixer. Thereafter, the resulting mixture was allowed to stand for 1 hour before washing the obtained vermiculite with water to produce thin leaves of vermiculite containing iron ions substituted for exchangeable cations retained therein. These thin leaves were formed into a sheet by the same method as in Example 1 to obtain a formed vermiculite product measuring 250 mm by 200 mm by 0.5 mm in thickness according to the first aspect of the invention. This product was then divided into two parts, each of which measured 125 mm by 100 mm. One of them was subjected to the same expansion treatment as in Example 1 so that it was uniformly expanded to obtain a thickness of 15 mm.

The other product was subjected to the same heat treatment as in Example 2 to obtain a formed vermiculite product having water resistance according to the fifth aspect of the invention. This product was immersed in water for a week, but it did not show any swelling phenomenon with water.

EXAMPLE 4

Fifty grams of exfoliated vermiculite prepared by the same method as in Example 1 was admixed with 2 liters of water and 31 g of ferric sulfate [$Fe_2(SO_4)_3 \cdot 9H_2O$] as an iron-ion-supplying substance, and the mixture thereof was crushed by processing in a home mixer. Thereafter, the resulting mixture was allowed to stand for 4 hours before washing the resulting vermiculite with water, whereby thin leaves of vermiculite containing iron ions substituted for exchangeable cations retained therein were obtained. These thin leaves were formed into a shaped vermiculite product measuring 250 mm by 200 mm by 0.5 mm in thickness by the same method as in Example 1. This product was divided into two parts, each of which measured 125 mm by 100 mm. One of them was subjected to the same expansion treatment as in Example 1 so that the formed vermiculite product was expanded to a thickness of 15 mm.

The other product was subjected to heat treatment at a temperature of 400° C. for 2 hours, whereby a shaped vermiculite product (having water resistance according to the fifth aspect of the invention) was obtained. The obtained product was immersed in water for a week, but it did not show any swelling phenomenon with water.

EXAMPLE 5

Fifty grams of exfoliated vermiculite were admixed with 2 liters of water and 25 g of cupric sulfate ($CuSO_4 \cdot 5H_2O$) as a copper-ion supplying substance, and the mixture thereof was crushed by processing in a home mixer. Thereafter, the resulting mixture was permitted to stand for 30 minutes before washing the resulting vermiculite with water, whereby thin leaves of vermiculite containing copper ions substituted for exchangeable cations retained therein were obtained. A shaped vermiculite product measuring 250 mm by 200 mm by 0.5 mm in thickness was made from these thin leaves in the same manner as in Example 1. The formed product was cut to obtain product measuring 50 mm by 50 mm, and the resulting product was subjected to the same expansion treatment as in Example 1. As a result, an expanded formed product of vermiculite having a thickness of 15 mm was obtained.

EXAMPLE 6

Fifty grams of exfoliated vermiculite prepared by the same method as in Example 1, 2 liters of water and 28 g of cobalt sulfate ($CoSO_4 \cdot 7H_2O$), as a cobalt-ion supplying substance, were mixed, crushed, allowed to stand for 24 hours and washed with water in the same manner as in Example 1, whereby thin leaves of vermiculite containing cobalt ions substituted for exchangeable cations retained therein were obtained.

From these thus-obtained thin leaves a sheet-shaped formed vermiculite product, measuring 250 mm by 200 mm by 0.5 mm, according to the first aspect of the invention was made. The sheet of vermiculite was cut to obtain a sheet measuring 50 mm by 50 mm. The resulting sheet was placed into a vessel having an inside diameter of 80 mm and a length of 10 mm, and 10 cc of an aqueous solution of 30% by volume of hydrogen peroxide was also introduced thereinto.

As a result, the aforesaid sheet was expanded in a direction of the third dimension with an exothermic reaction. Three minutes after the aqueous hydrogen peroxide was added into the vessel, the vessel was entirely filled with the expanded sheet.

EXAMPLE 7

Fifty grams of exfoliated vermiculite obtained by the same method as in Example 1 was admixed with 2 liters of water and 45 g of tin tetrachloride ($SnCl_4$), as a tin-ion-supplying substance, and the mixture thereof was then crushed by processing in a home mixer; it was then allowed to stand for 2 hours time before washing the resulting vermiculite with water to obtain thin leaves of vermiculite containing tin ions substituted for exchangeable cations retained therein. From the resulting thin leaves a shaped vermiculite product measuring 250 mm by 200 mm by 0.5 mm in thickness (according to the first aspect of the invention) was made in the same manner as in Example 1.

The thus-obtained formed product was divided into two parts, and one of them was subject to the same expansion treatment as in Example 1.

As a result, the thus-treated formed product was expanded by about 10 mm in thickness after 4 minutes.

The other product was subjected to heat treatment by mantaining the same at a temperature of 500° C. for 1 hour to obtain a shaped water-resistant vermiculite product according to the fifth aspect of the invention. The thus-obtained shaped product was immersed in water for a week, but it did not show any swelling phenomenon with water.

EXAMPLE 8

Fifth grams of exfoliated vermiculite were admixed with 2 liters of water and 14 g of zirconium tetrachloride ($ZrCl_4$), as a zirconium-ion-supplying substance, and the mixture thereof was crushed by processing in a home mixer, followed by standing for 10 minutes before washing the vermiculite with water, whereby thin leaves of vermiculite containing zirconium ions substituted for exchangeable cations retained therein were obtained. A shaped vermiculite product (according to the first aspect of the invention) measuring 250 mm by 200 mm by 0.5 mm in thickness was made in the same manner as in Example 1 from these thin leaves.

The thus-obtained formed product was cut into three parts, and one of them was immersed in water for 24 hours. However, the product did not show any swelling phenomen with water or exfoliation of thin leaves of vermiculite. Thus, it exhibited excellent water resistance.

Another part of the formed product was subjected to expansion treatment in the same manner as in Example 1. As a result, the thus-treated formed product was expanded to about 15 mm in thickness.

The third part of the formed product was subjected to heat treatment by maintaining the same at a temperature of 500° C. for 1 hour. The resulting formed product was immersed in tap water for a month, but it did not show any swelling phenomenon with such water. Thus, this formed vermiculite product retained excellent water resistance.

EXAMPLE 9

Fifty grams of exfoliated vermiculite obtained by the same method as in Example 1 was admixed with 2 liters of water, 10 g of metatitanic acid ($H_2TiO_3$), as a titanium-ion-supplying substance, and 1 cc of 12 N hydrochloric acid (HCl), and the mixture thereof was crushed by processing in a home mixer and then maintained for 20 hours before washing the resulting vermiculite with water to obtain thin leaves of vermiculite containing titanium ions substituted for exchangeable cations retained therein. A shaped vermiculite product (according to the first aspect of the invention) measuring 250 mm by 200 mm by 0.5 mm in thickness was made in the same manner as in Example 1 from these thin leaves.

This shaped product was cut to obtain a product measuring 50 mm by 50 mm, which was expanded by the method of Example 1. The resulting product was dried to obtain an expanded shaped vermiculite product measuring 50 mm by 50 mm by 10 mm in thickness.

EXAMPLE 10

Fifty grams of exfoliated vermiculite (obtained by the method of Example 1) were admixed with 2 liters of water and 15 g of potassium permanganate ($KMnO_4$), and the resulting mixture was crushed by processing in a home mixer and allowed to stand for 8 hours before washing the thus-treated vermiculite with water to obtain thin leaves of vermiculite containing manganese ions substituted for exchangeable cations retained therein.

A shaped vermiculite product (according to the first aspect of the invention), measuring 250 mm by 200 mm by 0.5 mm in thickness, was made from these thin leaves in the same manner as in Example 1.

This shaped product was cut to obtain a product measuring 50 mm by 50 mm, and it was expanded in the same manner as in Example 1. In this case, the shaped product started to expand in a thickness direction thereof with an exothermic reaction as soon as it was contacted with hydrogen peroxide. After about 1 minute, the thickness of the product was 15 mm at the central portion thereof. The expansion of the product at this portion was about 30 times greater than its original thickness.

EXAMPLE 11

Fifty grams of exfoliated vermiculite (obtained by the same method as in Example 1) were admixed with 2 liters of water and 18 g of zinc acetate [$Zn(CH_3COO)_2 \cdot 2H_2O$], as a zinc-ion-supplying substance, and the mixture thereof was crushed by processing in a home mixer and allowed to stand for 5 minutes before washing the thus-treated vermiculite with water to obtain thin leaves of vermiculite containing zinc ions substituted for exchangeable cations retained therein. A shaped vermiculite product (according to the first aspect of the invention), measuring 250 mm by 200 mm by 0.5 mm in thickness, was made from these thin leaves in the same manner as in Example 1.

This formed product was divided into three parts, and one of them was immersed in water for 24 hours. The resulting product did not show swelling with water or exfoliation of thin leaves of vermiculite. Thus, the product retained excellent water resistance.

Another formed product was subjected to expansion treatment in the same manner as in Example 1. As a result, this formed product was expanded to 13 mm in thickness.

The other formed product was maintained at a temperature of 500° C. for 1 hour before immersing it in tap water for a month. The resulting product did not swell with water. Thus, the formed product retained excellent water resistance.

EXAMPLE 12

Fifty grams of exfoliated vermiculite obtained by the same method as in Example 1 was admixed with 2 liters of water and 13 g of aluminum chloride ($AlCl_3$), as an aluminum-ion-supplying substance, and the mixture thereof was crushed by processing in a home mixer and allowed to stand for 24 hours before washing the thus-treated vermiculite with water to obtain thin leaves of vermiculite containing aluminum ions substituted for exchangeable cations retained therein.

A shaped vermiculite product measuring 250 mm by 200 mm by 0.5 mm in thickness was made from these thin leaves in the same manner as in Example 1.

This formed product was subjected to expansion treatment in the same manner as in Example 1. As a result, the obtained shaped product was expanded to about 9 mm in thickness.

What is claimed as new and intended to be covered by Letters Patent is:

1. A vermiculite product comprising thin leaves of vermiculite containing cations of at least one element (selected from the group consisting of copper, aluminum, manganese, a Group II element of the Periodic Table, a Group IV element of the Periodic Table and a Group VIII element of the Periodic Table) substituted for exchangeable cations retained therein, said substituted cations being substantially uniformly distributed on surfaces of said thin leaves and among layers thereof.

2. A vermiculite product according to claim 1, wherein the amount of cation exchange and adsorption in said thin leaves is at least 20 to 150 milliequivalents per 100 g of vermiculite.

3. A vermiculite product according to claim 2, wherein said thin leaves are stacked in layers or laminated and united with one another in a manner suitable for forming into a sheet or clod.

4. A vermiculite product according to claim 2, wherein said vermiculite product has a bulk density of from 0.9 to 2.5 (g/cm$^3$).

5. A vermiculite product according to claim 2, wherein said vermiculite product retains an expandable property and water resistance, as well as high strength and excellent heat resistance.

6. A vermiculite product according to claim 2, further comprising an additive which imparts strength at normal temperature and flexibility to said product.

7. A vermiculite product according to claim 6, wherein said additive is a member selected from the group consisting of organic fiber, inorganic fiber, rubber latex, polyvinyl alcohol and silicone rubber.

8. A vermiculite product according to claim 5, wherein said vermiculite product is a hydrogen peroxide expanded by contacting product.

9. An expanded vermiculite product according to claim 8, having light weight and a bulk density of from 0.06 to 0.9 (g/cm$^3$).

10. A vermiculite product according to claim 2, wherein
said at least one element is a member selected from the group consisting of zinc, a Group IV element and a Group VIII element and said thin leaves have a cation exchange capacity of at most 10 (milliequivalents/100 g).

11. A method for producing a vermiculite product according to claim 1, comprising the steps of:
crushing vermiculite to obtain thin leaves thereof;

subjecting said thin leaves to ion exchange to substitute exchangeable cations rtained in said thin leaves by exchangeable cations of at least one element selected from the group consisting of copper, aluminum, manganese, a Group II element, a Group IV element and a Group VIII element; and forming said thin leaves, subjected to said ion exchange, into a stack or laminate to be united with one another.

12. A method according to claim 11, wherein said thin leaves are subjected to said ion exchange for such a period of time that the amount of cation exchange and adsorption in said thin leaves is at least 20 to 150 milliequivalents per 100 g of vermiculite.

13. A method according to claim 11, wherein said thin leaves obtained by said crushing step have a thickness not exceeding 100 $\mu$m and an aspect ratio of at least 5.

14. A method according to claim 11, wherein vermiculite employed in said crushing step is an exfoliated vermiculite obtained by contacting vermiculite with hydrogen peroxide or heating the same.

15. A method according to claim 11, wherein said ion exchange step comprises dispersing said thin leaves of vermiculite in a liquid containing said cations to obtain a suspension thereof, and keeping said suspension for a predetermined period of time to perform said ion exchange in the thin leaves of vermiculite.

16. A method according to claim 15, wherein said liquid containing said cations is prepared by dissolving at least one cation-supplying substance in water, said cation-supplying substance being a compound of said at least one element required for said ion exchange.

17. A method according to claim 16, wherein said compound is a member selected from the group consisting of a sulfate, a nitrate, a chloride and an oxide of said at least one element required for said ion exchange.

18. A method according to claim 11, wherein said thin leaves, dispersed in cation-containing water, are allowed to stand for a period of time for natural sedimentation, are forcibly filtered for deposition on the bottom of an appropriate vessel or a filter paper, are subjected to a method similar to the papermaking process or are subjected to a method in which a slurry is formed from the thin leaves and an appropriate liquid and then coated on a flat plane.

19. A method according to claim 11, wherein said ion-exchange step comprises dispersing said thin leaves and an additive in a liquid containing said cations of at least one of the enumerated elements required for this purpose to obtain a suspension, and keeping said suspension for a predetermined period of time to permit said ion exchange in said thin leaves of vermiculite, thus obtaining a shaped vermiculite product.

20. A method according to claim 11, further comprising the step of:

contacting said formed vermiculite product with hydrogen peroxide to obtain an expanded shaped product.

21. A method according to claim 20, wherein said shaped vermiculite product is contacted with hydrogen peroxide in such a manner that said product is sprayed with an aqueous solution of from 1 to 40 percent by volume of hydrogen peroxide, coated therewith by a brush or immersed therein for a short time.

22. A method according to claim 11, wherein said cations to be substituted for exchangeable cations retained in said thin leaves are cations of at least one element selected from the group consisting of zinc, a Group IV element and a Group VIII element, further comprising the step of:

heating said formed vermiculite product subjected to ion exchange with said cations in an oxidative atmosphere to obtain a shaped vermiculite product having water resistance.

23. A method according to claim 22, wherein said heating is performed by maintaining said shaped vermiculite product at a temperature of from 150° to 600° C.

* * * * *

UNITED STATES PATENT AND TRADEMARK OFFICE
CERTIFICATE OF CORRECTION

PATENT NO. : 4,497,869
DATED : February 5, 1985
INVENTOR(S) : Osami Kamigaito, Haruo Doi and Yoshiaki Fukushima It is certified that error appears in the above-identified patent and that said Letters Patent are hereby corrected as shown below:

Claim 1, line 2, "cations" should read --polyvalent cations--.
Claim 8, line 3, "by contacting product" should read --product--.
Claim 11, line 5, "rtained" should read --retained--; line 6, "exchangeable" should read --polyvalent--.

Signed and Sealed this

Fifth Day of November 1985

[SEAL]

Attest:

Attesting Officer

DONALD J. QUIGG

Commissioner of Patents and Trademarks